United States Patent [19]
Vorwerk et al.

[11] Patent Number: 4,847,346
[45] Date of Patent: Jul. 11, 1989

[54] CURING COMPONENT FOR SYNTHETIC RESINS, CURABLE MIXTURES CONTAINING THE SAME, AND THE USE THEREOF

[75] Inventors: Edgar Vorwerk, Frankfurt am Main; Manfred Finke, Kelkheim; Rüdiger Lenz, Frankfurt am Main, all of Fed. Rep. of Germany

[73] Assignee: Hoechst AG, Fed. Rep. of Germany

[21] Appl. No.: 223,449

[22] Filed: Jul. 22, 1988

[51] Int. Cl.$^4$ ............................................. C08G 18/80
[52] U.S. Cl. ..................................................... 528/45
[58] Field of Search ......................................... 528/45

[56] References Cited
FOREIGN PATENT DOCUMENTS 0118743 6/1984 Fed. Rep. of Germany .
0159117 2/1985 Fed. Rep. of Germany .
0189727 11/1985 Fed. Rep. of Germany .
0206071 9/1986 Fed. Rep. of Germany .

*Primary Examiner*—Maurice J. Welsh
*Attorney, Agent, or Firm*—Bierman and Muserlian

[57] ABSTRACT

Curing component (A) based on polyisocyanates for binders (B) which contain groups containing active hydrogen, wherein the curing component (A) is a product of the reaction of (a1) polyisocyanates with (a2) α-hydroxyalkylpyridines.

Mixtures of (A) and (B), and also, if appropriate, diluents (C) and additives (D), are stable on storage and give, even at temperatures of 120°–140° C., curing products which are sufficiently solvent-stable. They are suitable, in particular, for surface-coating preparations.

12 Claims, No Drawings

CURING COMPONENT FOR SYNTHETIC RESINS, CURABLE MIXTURES CONTAINING THE SAME, AND THE USE THEREOF

The curing, i.e. cross-linking, of polymers and polycondensates containing hydroxyl and/or amino groups using blocked polyisocyanates has been known for some time and represens the state of the art; in this respect, see, for example, Petersen, Liebigs Ann. Chem. 562, 205 (1949). Blocked polyisocyanates here are taken to mean products of the reaction of polyisocyanates with certain substances (blocking agents), for example specific alcohols, amines, other hydroxyl compounds and mercaptans. These reaction products are stable at room temperature, in particular in the presence of reactive compounds, such as alcohols and amines, but eliminates the specific blocking agent at elevated temperature. The original isocyanate is thereby briefly regenerated and then immediately reacts with the hydroxyl and/or amino groups of the polymer to form temperature-stable urethanes or ureas, and crosslinked surface coating films are produced.

It is of particular economic and technical interest to carry out this hardening of surface coating films by means of blocked isocyanates at the lowest possible temperature. On the one hand, a reduced hardening or baking temperature directly reduces the energy consumption and thus leads to savings. On the other hand, current developments in automobile manufacture require the use of paint systems at hardening or baking temperatures which permit the metal body to be coated together with plastic parts mounted thereon. Since plastics are generally less thermally stable than metals, changes in shape of the plastic parts must be expected at relatively high baking temperatures.

There would therefore be considerable advantage technologically in reducing the baking temperature of about 160° C. which is customary today to about 130° C.

In European Offenlegungsschrift No. 118,743, novel urethanes are described which are prepared by reacting polyisocyanates with derivatives of 2-hydroxyalkanoic acids, in particular glycolic acid, and are claimed as curing agents for hydrogen-active compounds. Although the baking temperatures given here are 120° to 130° C., the surface coating films thus obtained have inadequate solvent resistance. The glycolic acid derivatives used, such as, for example, glycolamides, additionally have the disadvantage of being non-volatile, which means that the blocking agent liberated remains on the coating surface when the reaction is complete and does not evaporate rapidly at the temperatures used.

Pyrazoles, in particular 3,5-dimethylpyrazole, are disclosed in EP Offenlegungsschrift No. 159,117 as protecting groups for polyisocyanates. Although the polyisocyanates blocked using such pyrazoles cure polymeric products of the reaction of epoxides and amines at temperatures from 130° C., the polyisocyanates blocked using these pyrazoles are, however, not sufficiently stable on storage in the presence of substances containing primary and secondary amino groups, in particular in aqueous solutions, which means that their use is hardly suitable, at least in aqueous application systems of this type.

The products, described in European Offenlegungsschrift No. 189,727, of the reaction of longer-chain alkanone oximes with aromatic polyisocyanates also harden products of the reaction of epoxides and amines from 120° C. The disadvantage of these blocked polyisocyanates is their inadequate stability, in particular in aqueous applications, which means that the problems of inadequate stability of storage is also present here.

Finally, European Offenlegungsschrift No. 206,071, which appeared recently, relates the polyisocyanates blocked using furfurylalcohol as curing agents for cathodic electro-coating materials. These polyisocyanates blocked using furfuryl alcohol only begin to harden from 135° C.; complete deblocking therefore requires either relatively long heating times or relatively high temperatues.

There was therefore a demand for curing agents based on partly or fully blocked polyisocyanates for binders (synthetic resins) containing active hydrogen, where these curing agents should be stable over a long period at room temperature or at slightly elevated temperature in the presence of the these synthetic resins, should be rapidly and completely deblocked in the temperatue range 120° to 130° C., and should result in good crosslinking of the synthetic resins.

To this end, the invention proposes a curing component (A) based on polyisocyanates for binders (B) which contain groups containing active hydrogen, wherein this curing component (a) is a product of the reaction of polyisocyanates (a1) with α-hydroxyalkylpyridines (a2).

The invention furthermore relates to curable mixtures which contain the hardening component (a), if appropriate already linked to the binder (B), and to the use of these curing components in curable mixtures, in particular surface-coating formulations specifically for electrocoating.

Besides the urethane groups produced by the reaction of isocyanate groups with α-hydroxyalkylpyridines, the curing components (A) according to the invention can also contain, depending on the (a1):(a2) mixing ratio, unreacted isocyanate groups, i.e. the curing agents (A) can be fully or partly blocked polyisocyanates. The latter are reacted directly with the synthetic resin (B), producing—in the presence of reactive H atoms which are still free—auto-crosslinking binders.

The α-hydroxyalkylpyridines employed as blocking agents are the positional isomers 2-, 3- and 4-hydroxymethyl pyridines themselves or substitution products thereof, the substituents entering replacing a hydrogen atom of the hydroxymethyl group and/or of the pyridine ring. In special cases, di-(α-hydroxyalkyl)pyridines are also suitable here. These substituents should at the same time be selected so that the stability on storage and the deblocking temperature are not significantly affected. In addition, the volatility of the blocking agent should not thereby be reduced too much.

These α-hydroxyalkylpyridines preferably have the formula (I)

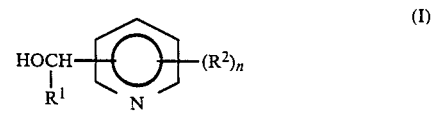

(I)

in which $R^1$ and $R^2$, independently of one another, and n have the following meanings:

$R^1$ = H, branched or unbranched alkyl, preferably having 1 to 12, in particular 1 to 6, carbon atoms, alkenyl having 2 to 12, preferably 2 to 6, carbon atoms, cycloalkyl having 6 to 12, preferably 6 to 10, carbon atoms, or aryl, such as phenyl, benzyl, tolyl, xylyl or naphthyl, preferably phenyl, R² = H, branched or unbranched alkyl, preferably having 1 to 12, in particular 1 to 6, carbon atoms, ($C_1$-$C_6$) alkoxy, preferably methoxy or ethoxy, Di($C_1$-$C_6$)alkylamino, or halogen, preferably chlorine or bromine; in the case where n>1, the radicals R² here may be identical or different in the context of the above definition;

n=1 to 3, preferably 1 or 2 and in particular 1.

In the above formula, R¹ preferably represents H or ($C_1$-$C_6$)alkyl, such as methyl, ethyl, propyl, butyl or pentyl or represents phenyl, and the pyridine radical preferably contains no further substituents (R² = H) or is additionally substituted by one (n = 1) alkyl radical having 1 to 6 carbon atoms or by one ($C_1$-$C_6$)alkoxy radical, preferably methoxy or ethoxy. α-hydroxyalkylpyridines having appropriately high volatility are particularly suitable here.

Examples of α-hydroxyalkylpyridines which can be employed as blocking agents according to the invention are 2-hydroxymethylpyridine, 3-hydroxymethylpyridine, 4-hydroxymethylpyridine, 2-, 3- and 4-(α-hydroxyethyl)pyridine, 2-, 3- and 4-(α-hydroxypropyl)pyridine, 2-(hydroxymethyl)-4-methylpyridine, 2-(hydroxymethyl)-5-ethylpyridine, 2-(hydroxymethyl)-6-methylpyridine, 4-(hydroxybenzyl)pyridine, 2-(hydroxymethyl)-6-chloropyridine or 3-(hydroxymethyl)-6-bromopyridine.

Mixtures of various α-hydroxyalkylpyridines are also possible.

The α-hydroxyalkylpyridines employed according to the invention are mostly compounds known from the literature, and several synthetic routes frequently exist; only the most important are therefore mentioned here.

The three isomeric hydroxymethyl pyridines are obtained industrially by reducing the corresponding pyridine aldehydes, which are themselves accessible by catalytic oxidation of methyl pyridines (picolines); in this respect, see: Ullmanns Enzyklopädie d. techn. Chemie [Ullmann's Encyclopaedia of Industrial Chemistry], 4th edition, volume 19, 605–607.

After reaction with Grignard reagents, the pyridine aldehydes give longer-chain α-hydroxyalkylpyridines; for example

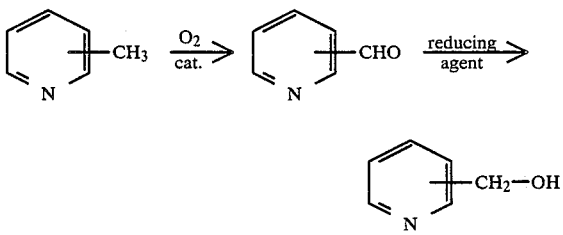

See Luz et al., Helv. 38 [1955] 1144, 1116.

The halogen atom in various substituted bromopyridines can be replaced by metals in the customary manner, i.e. converted into a Grignard reagent or into the lithiated compound, for example using butyllithium, in which can be reacted with aliphatic or aromatic aldehydes to give the target substances, for example:

See Leonard Ryder, J. org. Chem. 18 [1953] 598, 605.

A further way of synthesizing α-hydroxyalkylpyridines is the rearrangement of alkylated pyridine N-oxides in, for example, acetic anhydride (so-called Katada reaction) to give α-acetoxyalkylpyridines and subsequent hydrolysis to give the corresponding alcohols, for example:

See Hardegger, Nikles Helv. 40 [1957], 2428 ff.

The polyisocyanates which are reacted with the blocking agents according to the invention to form the curing component (A) are compounds known from polyurethane or surface-coating chemistry, such as aliphatic, cycloaliphatic or aromatic polyisocyanates or the corresponding prepolymers, if appropriate mixed with one another. These polyisocyanates contain at least two isocyanate groups, and their number is preferably 2 to 10 and in particular 2 to 4.

Examples of such polyisocyanates are aliphatic trimethylene, tetramethylene, pentamethylene, hexamethylene, 1,2-propylene, 1,2-butylene, 2,3-butylene, 1,3-butylene, ethylidene and butylidene diisocyanates, 2,2,4-trimethylhexamethylene diisocyanate, 1,12-dodecane diisocyanate, dicycloalkylene diisocyanates, such as 1,3-cyclopentane diisocyanate, 1,4-cyclopentane diisocyanate and 1,2-, 1,3- and 1,4-cyclohexane diisocyanate, and also isophorone diisocynate (IPDI), furthermore diisocyanates of dimeric acids, aromatic diisocyanates, such as 1,3-phenylene, 1,4-phenylene, 4,4'-diphenyl, 1,5-naphthalene and 1,4-naphthalene diisocyanates, 4,4'-diphenylenemethane, 2,4, 2,6-toluene, 4,4'-toluidene and 1,4-xylylene diisocyanates, dianisidine diisocyanate, 4,4'-diphenyl ether diisocynate and chlorodiphenylene diisocyanate, diphenylmethane, 2,4'- and/or 4,4'-diisocyanate, 3,2'- or 3,4-diisocyanato-4-methyldiphenylmethane, triisocyanates, such as triphenylmethane, 4,4',4''-triisocyanate, benzene 1,3,5-triisocyanate and toluene 2,4,6-triisocyanate, and tetraisocyanate, such as 4,4'-diphenyldimethyldimethane 2,2',5,5'-tetraisocyanate, or mixtures of these compounds.

Besides these simple polyisocyanates, those are also suitable which contain heteratoms in the radical linking the isocyanate groups. Examples of these are polyisocyanates containing carbodiimide groups, allophanate groups, isocyanurate groups, urethane groups, acylated urea groups or biuret groups.

Polyisicyanates which can be employed are furthermore polymerized polyisocyanates, such as the dimers of toluylene diisocyanates, isocyanurate-containing polyisocyanate made from 3-isocyanatomethyl-3,3,5-trimethylcyclohexyl isocyanate and the like, or alternatively trimerised isocyanates, as described, for example, in German Pat. No. 951,168.

Finally, suitable polyisocyanates are also the known prepolymers containing terminal isocyanate groups, as are accessible, in particular, by reacting the abovementioned simple polyisocyanates, above all diisocyanates, with substoichiometric amounts of organic compounds containing at least two groups which are reactive towards isocyanate groups, such as polyols or water. Examples of such polyols are trimethylolethane, trimethylolpropane, pentaerythritol, di(trimethylolpropane), dipentaerythritol, glycerol, triethanolamine, oxyethylated oxypropylated derivatives of the polyols mentioned and products of the reaction of these polyols with caprolactone, carboxylic acid and epoxides. An example of prepolymers of this type which may be mentioned here is the product of the reaction of 1 mole of trimethylolpropane with 3 moles of toluylene diisocyanate or IPDI. Furthermore, a product of the reaction of 1 mole of water and 3 moles of hexamethylene diisocyanate which has an NCO content of 16 to 17% by weight is also suitable. Compounds in the molecular weight range 300 to 10,000, preferably 400 to 6,000 which contain a total of at least two amino groups and/or hydroxyl groups are also suitable for reaction with the polyisocyanates. The corresponding polyhydroxyl compounds, for example the hydroxypolyesters, hydroxypolyethers and/or hydroxyl group-containing acrylates resins which are known per se in polyurethane chemistry, are preferred here. Regarding such polyhydroxyl compounds, reference is made, for example, to German Offenlegungsschrift No. 3,124,784.

In these known prepolymers, the ratio between isocyanate groups and NCO-reactive hydrogen atoms is 1.05 to 10:1, preferably 1.1 to 3:1, the hydrogen atoms preferably originating from hydroxyl groups.

The type and mixing ratios of the starting materials employed in the preparation of the NCO prepolymers are, in addition, preferably selected so that the NCO prepolymers have a mean NCO functionality of 2 to 4, preferably 2 to 3, and a mean molecular weight of 500–10,000 preferably 800 to 4,000.

To prepare the curing agents (A) according to the invention, the polyisocyanates are reacted with the α-hydroxyalkylpyridines by known processes, expediently under exclusion of atmospheric moisture. The ratio between the number of equivalents or isocyanate groups in the polyisocyanates and the OH groups in the α-hydroxyalkylpyridines is generally 2.2:1 to 0.9:1, preferably 2:1 to 1:1.

The reaction is expediently carried out in the temperature range 0° to 100° C., preferably at 5° to 80° C., and the reaction time is generally 2 to 8 hours. This reaction usually proceeds extremely exothermically, so that addition of catalysts can be omitted. However, the use of 0.1 to 2% by weight of a catalyst (relative to the sum of (a1) and (a2)) is possible. Suitable catalysts are, for example: tertiary amines, such as triethylamine, dimethylbenzylamine and 1,4-diazabicyclo(2,2,2)octane, and metal salts, such as dibutyltin dilaurate, dibutyltin oxide, tin octoate and zinc acetylacetonate.

The reaction of (a1) with (a2) is generally carried out in the presence of an inert solvent. Examples of inert solvents are: ethers, such as diisopropyl ether, methyl-t-butyl ether, ethylene glycol dimethyl ether and diethylene glycol dimethyl ether, ketones, such as methyl ethyl ketone, methyl isobutyl ketone and cyclohexanone, and furthermore dimethylformamide, N-methylpyrrolidone, dimethyl sulfoxide and the like.

The addition of α-hydroxyalkylpyridines with the isocyanate groups can be monitored by IR spectroscopy or by titrating the isocyanate groups against dibutylamine. In general, the α-hydroxyalkylpyridines are added dropwise to the polyisocyanates; the reverse addition is also possible and may even be advantageous in individual cases.

If, in this reaction, the ratio between (a1) and (a2) is selected so that (a2) is present in deficiency, only partially blocked polyisocyanates are produced whose free isocyanate groups can subsequently be reacted with the synthetic resin (B). In this way, the curing component (A) is bound directly into the synthetic resin (B) and imparts self-curing properties on the latter.

Compared with curing agents of similar structure of the prior art, such as, for example, products of the reaction of isocyanates with various benzyl alcohols for furfurylalcohols or alternatively amino alcohols, the curing agents (A) according to the invention surprisingly have a deblocking temperature which is reduced by 10° to 30° C.; in this case, the curing reaction usually takes place even from 120° C. In addition, the curing agents (A) are stable in the presence of polymers containing hydroxyl and/or amino groups, even in aqueous systems, and have good stability to hydrolysis, even in slightly acid solutions. It is furthermore advantageous that the α-hydroxyalkylpyridines liberated are mostly oils which can be evaporated from the coating surface extremely readily.

The invention furthermore relates to curable mixtures based on the curing component (A), a binder (B) which contains groups contaning active hydrogen, if appropriate a diluent (C), and if appropriate additives (D).

Suitable synthetic resins (B) are binders which are known per se, can be cured using polyisocyanates and contain active hydrogen, i.e. functional groups which are able to react with isocyante groups under the curing conditions. These are preferably hydroxyl and/or primary and/or seconary amino groups, at least two of these groups being present on average per molecule.

The molecular weight (number average $\overline{M}_n$) of (B), determined by means of gel chromatography (polystyrene standard), is usually in the range from about 500 to 50,000, preferably about 1,000 to 20,000. Thus, these binders (B) preferably have resinous character. In special cases, the molecular weight may be 100,000 or more. Suitable polymers here are polymers, polycondensates or polyaddition compounds.

Examples of binders (B) are OH group-containing synthetic resins (polyols), such as polyether polyols, polyacetal polyols, polyester amine polyols, epoxy resin polyols or products of the reaction thereof with $CO_2$, phenolic resin polyols, polyurea polyols, polyurethane polyols, cellulose ester polyols, cellulose ether polyols, partially hydrolysed homopolymers and copolymers of vinyl esters, partially acetalated poly(vinyl alcohols), polyester polyols or acrylate resin polyols. In addition, phenol resins, urea resins or melamine resins are suitable here. Polyoles of this type, which can also be employed in mixtures are described, for example, in German Offenlegungsschrift No. 3,124,784 and in European Offenlegungsschriften Nos. 123,880 and 189,728.

Synthetic resins (A) containing hydroxyl and amino groups are described, for example, in Journal of Coatings Technology, Vol. 54, No. 686, (1982), pp. 33 to 41 ("Polymer Compositions for Cationic Electrodepositable Coatings"), where it is likewise referred to here. Polymers of $\alpha,\beta$-olefinically unsaturated monomers which contain hydroxyl and/or amino groups may be mentioned here. THe hydroxyl and/or amino groups can be introduced by using appropriate monomers in the copolymerisation, for example through hydroxyl esters or amino esters of $\alpha,\beta$-olefinically unsaturated carboxylic acids, such as hydroxyalkyl (meth)acrylates or aminoalkyl (meth)acrylates, or by polymer-analogous reaction with diamines or polyamines, for example with N,N-dimethylaminopropylamine, with the formation of amide, amino or urethane groups. A further group comprises the polyaminopolyamides obtainable from dimerised fatty acids and polyamines. Aminopolyether polyols, which are accessible by reacting ammonia, primary, secondary and/or tertiary amines or diketimines or appropriate mixtures with a polyglycidyl ether, are particularly suitable for this purpose. Expediently, a sufficient number of epoxide groups should be present so that all the amino groups are converted into tertiary amino groups. The preferred polyglycidyl ethers are polyglycidyl ethers of bisphenol A and similar polyphenols. They can be prepared, for example, by etherifying a polyphenol using an epihalohydrin, such as epichlorohydrin, in the presence of alkali.

In place of the polyglycidyl ethers, their reaction product with $CO_2$ can also be employed. The products contain cyclic carbonate groups which can be employed with primary amines with formation of urethanes. Depending on the molar ratios between the polyglycidyl ethers and the $CO_2$, compounds which no longer contain epoxide groups or compounds which contain epoxide groups and cyclic carbonate groups are obtained on reaction with $CO_2$. Cyclic carbonate groups of this type can also be introduced into the polymer chain via appropriate monomers containing these groups; in this respect see German Patent Applications Nos. P 3,644,372.7 and P 3,644,373.5. The reaction with amines of polymers containing such cyclic carbonate groups with formation of so-called aminourethanes is described, for example, in European Patent Applications Nos. 87.101.797.6 and 87.107.309.4 and in German Patent Application No. P 3,644,370.0.

The polyglycidyl ethers of the polyphenols or reaction products thereof with $CO_2$ can be reacted as such with the amines, but it is frequently advantageous to react some of the reactive epoxide groups with a modified material in order to improve the film properties. Reaction of the epoxide groups with a polyol or a polycarboxylic acid is particularly preferred.

The modification of the amino polyether polyols using polyols or polycarboxylic acids preferably takes place before reaction of the polyglycidyl ethers or reaction products thereof with $CO_2$ with the primary or secondary amines. However, it is also possible to select the ratio between the polyglycidyl ether used as starting material and the amines so that an excess of epoxide groups is present. The epoxide groups can then be reacted with the polycarboxylic acids or polyols. It is furthermore possible to further modify the final product no longer containing epoxide groups by reacting the hydroxyl groups with glycidyl ethers.

The amino equivalent weight of these binders (B) is expediently 150 to 4,000, preferably 500 to 2,000, whereas the hydroxyl equivalent weight, if the binders contain OH groups, is generally between 150 and 1,000, preferably 200 and 500. The binders can additionally contain C=C double bonds, the C=C equivalent weight preferably being 2,000 to 6,000.

When used in electrocoatings, the number of basic groups in the binder (B) should be selected so that adequate water-dilutability in acidic media is ensured.

In the case of non-self curing systems (so-called two-component surface coatings), the curing agent (A) and the binder (B) are generally mixed in ratios such that the ratio between the number of equivalents of blocked isocyanate groups andn of hydrogen-active groups is 0.2 to 1.5:1, preferably 0.4 to 1.1:1. For this purpose, the amount of (A) is usually 20 to 60% by weight, preferably 20 to 40% by weight, relative to (B). In this way, an adequate crosslinking density is generally achieved.

When used as powder coatings, the curable mixture according to the invention does not contain any diluent (C). In the preferred use as liquid surface-coating formulations, however, the customary diluents (C) are present. Suitable such diluents are, for example, the known organic solvents, such as: halogenated hydrocarbons, ethers, such as diethyl ether, 1,2-dimethoxyethane, tetrahydrofuran or dioxane; ketones, such as, for example, acetone, methyl ethyl ketone, methyl isobutyl ketone, cyclohexanone and the like; alcohols, such as methanol, ethanol, 2-butoxyethanol, propanol, isopropanol, 2-methoxy-1-propanol, butanol and benzyl alcohol; esters, such as butyl acetate, ethyl glycol acetate, methoxypropyl acetate; (cyclo)aliphatic and/or aromatic hydrocarbons, such as hexane, heptane, cyclohexane, benzene, toluene, various xylenes and aromatic solvents in the boiling range from about 150° to 180° C., such as ®Solvesso. In this case, the solvents can be employed individually or in mixtures. Mixtures with water are also possible.

In the case of the preferred use of water as diluent (C), for example in electrocoating materials, the binders (B) contain cationic, anionic or non-ionogenic water-solubilizing groups. Examples of cationic groups are ammonium, phosphonium and sulfonium cations and examples of anionic groups are ammonium salts of carboxylic acids. Suitable non-ionogenic groups are, for example, oxethylates and oxypropylates.

Particularly for the productionof cathodically depositable electrocoating materials, the synthetic resins (B) which preferably contain amino groups and are expediently present in inorganic solvents, and the curing agents (A) are mixed, and all or some of the amino groups are neutralized by reaction with a water-soluble acid, for example formic acid, acetic acid, lactic acid, phosphoric acid etc., before being diluted with water. In each individual case, the amount of water depends on the properties of the resin used and is generally only carried out until the resin is solubilized or dispersed.

Aqueous formulations, which have a particularly low content of volatile, organic solvents, are obtained, and described, for example, in German Patent Application No. P 3,602,980.7, by removing the solvent present in the binders by distillation before producing the solution. This process step is preferably carried out under reduced pressure.

In the context of (D), examples of customary additives which may be present in the curable mixture according to the invention are—depending on the particular purpose of use—the customary surface-coating additives, such as pigments (iron oxide, lead oxide, lead silicates, titanium dioxide, barium sulfate, zinc oxide, zinc sulfide, phthalocyanine complexes etc.), pigment pastes, antioxidants, (UV) stabilizers, flow-control agents, thickeners, antifoaming agents and/or wetting agents, reactive thinners, fillers (talc, mica, kaolin, chalk, quarts powder, asbestos powder, slate powder, various silicas, silicates etc.), additional curing agents and additional curable compounds, catalysts and the like. If desired, addition of these additives to the mixture may be delayed until immediately before processing.

Suitable catalysts for accelerating the curing reaction are, for example, salts or complexes of metals, such as, for example, lead, zinc, iron, tin, manganese and bismuth. Preferred metallic catalysts here are dialkyltin dicarboxylates, such as dibutyltin dilaurate and dibutyltin diacetate, furthermore dibutyltin oxide, lead octoate and lead acetylacetanate. The amount of catalyst is generally 0.1 to 2.0% by weight, preferably 0.5 to 2% by weight (relative to the sum of (A) and (B)). This amount can be varied depending on the reactivity of the compounds (A) and (B), the type of solvent which may be present, the activity of the catalyst and the way in which the process is intended to be carried out. The metallic catalysts can be mixed directly with the starting materials or, dispersed in a suitable binder, added separately to the surface-coating material.

If the curable mixture is a dispersion, the content of (A) and (B) is generally 10 to 80% by weight, advantageously 35 to 70% by weight.

In order to produce the curable mixtures according to the invention, components (A) and (B) and, if appropriate additionally (C) and (D) are mixed. In the case of components having low viscosity, this can take place in the absence of solvents, the mixture being warmed to elevated temperatures if necessary. If the curable mixtures are not employed as powder coatings, products of relatively high viscosity are dissclosed or dispersed in the diluents mentioned before mixing.

The curing of the mixtures according to the invention proceeds very rapidly and, at temperatures from 120° to 140° C. and baking times from 20 to 40 minutes, already gives coatings of good hardness and good solvent resistance.

Due to their favorable properties, the mixtures according to the invention have a wide variety of industrial uses, for example for the productionof moldings (casting resins), for tool manufacture or for the production of coatings and/or intermediate coatings of a wide variety of substrates, for example on substrates of an organic or inorganic nature, such as wood, wood pulp (wood sealing), textiles of natural or synthetic origin, plastics, glass, ceramic, building materials, such as concrete, fiberboard, artificial stones, but in particular on metal, such as iron, aluminum, copper and the like. The metal surfaces, in particular in the case of iron, can, if desired, have been primed by zinc-plating, phosphating, zinc-phosphating etc. In addition, the mixtures according to the invention can be employed as components of adhesives, cements, laminating resins, synthetic resin cements and, in particular, as components of paints and surface coatings for coating industrial objects, household appliances, furniture and in civil engineering, such as, for example, refrigerators, washing machines, electrical applicanes, windows and doors. Application can take place, for example, by brushing, spraying, dipping, electrostable coating and the like. In the case of electroconducting substrates, electrolytic deposition is preferred.

A preferred field of application for the mixtures according to the invention is in surface-coating preparations, in particular electrocoating materials.

The invention is illustrated in greater detail by the examples below.

EXAMPLES

I. Preparation of the Binder (B)

415 g (0.5 mol) of ®Capa 205 ($\alpha,\omega$-polyesterdiol having $\overline{M} \sim 830$ supplied by Messrs. Interox), 550 g (0.5 mol) of ®Pluriol 3100 ($\alpha,\omega$-polyether diol having $\overline{M} \sim 1,100$ supplied by BASF AG), 304 g (2 mol) of tetrahydrophthalic anhydride and 1.3 g of triethylamine were warmed for about 6 hours at 110° to 120° C. When the acid number had reached a value of 90 to 92 (theory: 88), the mixture was cooled to 100° C. 832 g (2 mol) of the monocarbonate of bisphenol A glycidyl ether and 8.4 g of AMC-2 (chromium (III) salt of a fatty acid; Messrs. Cordova Chemical) were then added to the reaction mixture, which was stirred for a further 3 hours at 100° C. When the acid number had reached a value $\leq 10$ and the epoxide number a value $\leq 0.1$, the mixture was diluted with 905 g of diglycol dimethyl ether and cooled to 70° C.

The resin solution thus obtained was subsequently mixed with 3144 g (3 mol) of the biscarbonate of ®Epicote 1001 (epoxy resin based on bisphenol H/epichlorohydrin having $\overline{M} \sim 4000$, Shell), 608 g (2 mol) of the carbonate based on the glycidyl ester of versatic acid, and 2,167 g of methoxypropanol, and subsequently reacted with 645 g (3 mol) of bis-hexamethylenetriamine and 660 g (2 mol) of trimethylhexyl-1,3-bis(6-aminohexylamino)-2-propanol. After a reaction time of 7 hours at 70° C., the amine number was determined.

Amine number: 55.5 (theory: 54.7).

II. Preparation of the Isocyanate Curing Agent (A)

1. 160.23 g (0.92 mol) of toluylene diisocyanate (industrial product comprising about 80% of 2,4-toluylene diisocyanate and about 20% of 2,6-toluylene diisocyanate) were initially introduced at room temperature dissolved in 200 ml of diethylene glycol dimethyl ether. 41.14 g (0.307 mol) of 1,1,1,-tri-(hydroxymethyl)propane were added to this solution in portions, the temperature increasing to 38° C. After stirring for 2.5 hours at 35° C., 5 to 8 drops of dibutyltin dilaurate were added. The temperature then rose to 47° C., and the mixture was stirred for a further 3 hours at 45° C. 100.4 g (0.92 mol) of 2-(hydroxymethyl)pyridine were added over the course of 40 minutes, likewise at 45° C., to the solutions, prepared in this way, of the adduct of toluylene diisocyanate and 1,1,1-tris(hydroxymethyl)propane, a temperature increase to 62° C. being observed. The mixture was subsequently stirred for 6 hours at 65° C. A clear, readily pourable solution was obtained whose content of free isocyanate groups was determined titrimetrically at <0.1%.

2. 174.16 g (1.0 mol) of toluylene diisocyanate (industrial product comprising about 80% of 2,4-toluylene diisocyanate and about 20% of 2,6-toluylene diisocyanate) were initially introduced at room temperature, dissolved in 200 ml of diethylene glycol dimethyl ether. 44.72 g (0.33 mol) of 1,1,1-tris-(hydroxymethyl)propane were added to this solution, whereupon the temperature increased to about 36° C. After stirring for 2.5 hours at 35° C., 5-8 drops of dibutyltin dilaurate were added. The temperature then increased to 50° C., and the mixture was subsequently stirred for a further 3 hours at 45° C. 109.13 g (1.0 mol) of 3-(hydroxymethyl)pyridine were added dropwise over the course of 80 minutes, likewise at 45° C., to the solution, prepared in this way, of the adduct to toluylene diisocyanate and 1,1,1tris-(hydroxymethyl)propane, a temperature increase to 62° C. being observed. The mixture was subsequently stirred for a further 6 hours at 65° C. and subsequently diluted with 65 ml of diethylene glycol dimethyl ether. The titrimetically determined content of free isocyanate groups was less than 0.1%.

3. 104.5 g (0.6 mol) of toluylene diisocynate (industrial product comprising about 80% of 2,4-toluylene diisocyanate and about 20% of 2,6-toluylene diisocyanate) were initially introduced at room temperature, dissolved in 180 ml of diethylene glycol dimethyl ether. 26.84 g (0.2 mol of 1,1,1-tris-(hydroxymethyl)propane were added to this solution, the temperature increasing to 35° C. The mixture was stirred for a further 3.5 hours at this temperature, 5 to 8 drops of dibutyltin dilaurate were then added, and the mixture was subsequently stirred for a further 3 hours at 45° C. 65.48 g (0.6 mol) of 4-(hydroxymethyl)pyridine were added over the course of 10 minutes, likewise at 45° C., to the solution, prepared in this way, of the adduct of toluylene diisocyanante and 1,1,1-tris-(hydroxymethyl)propane. The 4-(hydroxymethyl)-pyridine dissolved rapidly, and the exothermic reaction caused the temperature of the reaction mixture to increase to 70° C. The mixture was stirred for a further 6 hours at 65° C., and the slurry-like suspension was diluted with 29 ml of diethylene glycol dimethyl ether. Free isocyanate groups could no longer be detected titrimetrically in the reaction product.

4. 104.5 g (0.6 mol) of toluylene diisocyanate (industrial product comprising abour 80% of 2,4-toluylene diisocyanate and about 20% of 2,6-toluylene diisocyanate) were initially introduced at room temperature, dissolved in 180 ml of diethylene glycol dimethyl ether. 26.84 g (0.2 mol) of 1,1,1-tris-(hydroxymethyl)propane were added to this solution, the temperature increasing to 35° C. The mixture was stirred at this temperature for a further 2.5 hours, 5-8 drops of dibutyltin dilaurate were then added, and the mixture was subsequently stirred for a further 3 hours at 45° C. 32.74 g (0.3 mol) of 2-(hydroxymethyl)pyridine and 32.74 g (0.3 mol) of 3-(hydroxymethyl)pyridine were added over the course of 10 minutes, likewise at 45° C., to the solution, prepared in this way, of the adduct of toluylene diisocyanate and 1,1,1-tris-(hydroxymethyl)propane. The temperature of the reaction mixture increased to 69° C. The mixture was stirred for a further 6 hours at 65° C. A clear, readily pourable solution was obtained whose content of free isocyanate groups was determined titrimetrically at <0.1%.

5. 104.5 g (0.6 mol) of toluylene diisocyanate (industrial product comprising about 80% of 2,4-toluylene diisocyanate and about 20% of 2,6-toluylene diisocyanate) were initially introduced at room temperature, dissolved in 180 ml of diethylene glycol dimethyl ether. 26.84 g (0.2 mol) of 1,1,1-tris-(hydroxymethyl)propane were added to this solution, the temperature increasing to 35° C. The mixture was stirred at this temperature for a further 2.5 hours, 5-8 drops of dibutyltin dilaurate were then added, and the mixture was subsequently stirred for a further 3 hours at 45° C.

32.74 g (0.3 mol) of 2-(hydroxymethyl)pyridine and 32.74 g (0.3 mol) of 4-(hydroxymethyl)pyridine were added over the course of 10 minutes, likewise at 45° C., to the solution, prepared in this way, of the adduct of toluylene diisocyanate and 1,1,1-tris-(hydroxymethyl)propane. The temperature of the reaction mixture increased to 74° C. The mixture was stirred for a further 6 hours at 65° C. A clear, readily pourable solution was obtained whose control of free isocyanate groups was determined titrimetrically at <0.1%.

III. Testing of the Curing Agents

The (hydroxymethyl)pyridine-blocked isocyanates of Examples II.1-5 and analogously prepared comparison products were mixed with the binder describred in Example I, in each case in the weight ratio 30:70 (relative to the solids content), and applied to phosphated metal sheets (coating thickness of the wet form; 100 μm) in the presence of a metal salt (1% of metal based on the solid resin).

The coating films were baked for 30 minutes at between 120° and 130° C. and their resistance to solvents was investigated. In this investigation, a coating film was regarded as hardened if it had not been attached after at least 50 double wipes with a cotton wood swab soaked in methyl ethyl ketone at a contact pressure of 1 kp.

In Table 1 below, the solvent resistance of various coating films were compared with one another. It can be seen that isocyanate adducts containing 3,5-dimethylpyrazole and 2-heptanone oxime as the protecting group have comparable hardening properties to the curing agents shown as examples and prepared in accordance with Example II.1. In contrast, polyisocyanates blocked using furfuryl alcohol and N,N-dibutylglycolamide have a significantly lower solvent resistance.

If the stability on storage of the blocked isocyanates at 30° to 40° C. in the presence of secondary amines is compared, it is apparent that the curing agent prepared in accordance with Example II.1. is stable in the presence of dibutylamine, whereas the polyisocyanates blocked using 2-heptanone oxime and 3,5-dimethylpyrazole are attacked by butylamine, even at 30° C.

In order to quantitatively determine the exchange reaction of the protecting groups by dibutylamine, isocyanate curing agents were warmed for 4 hours at 30° or 40° C: in a mixture of isopropanol and dioxane after addition of a measured amount of dibutylamine, and the unreacted proportion of the dibutylamine was back-titrated with 0.1N hydrochloric acid. The proportion of the urethane groups replaced by dibutylamine was given in % NCO. The results are collated in Table 2.

TABLE 1

| Protecting group | Polyisocyanate | Catalyst | Number of double wipes with MEK (120° C.) | (130° C.) |
|---|---|---|---|---|
| 2-hydroxymethylpyridine (of Example II.1.) | TDI[1]/TMP[2] | Sn | 20 | 100 |
|  |  | Pb | 100 | 100 |
| $HOCH_2\overset{O}{\overset{\|}{C}}N(C_4H_9)_2$ (from EP 118,743) | TDI/TMP | Sn | 20 | 50 |
|  |  | Pb | 30 | 90 |
| furfuryl alcohol (from EP 205,071) | TDI/TMP | Sn | 5 | 5 |
|  |  | Pb | 5 | 5 |
| 2-Heptanone oxime (from EP 189,727) | TDI/TMP | Pb | 100 | 100 |
| 3,5-dimethylpyrazole (EP 157,117) | IPDI[3]/TMP | Pb | approx. 50 | 100 |

[1] 80% of 2,4-toluylene diisocyanate
[1] 20% of 2,6-toluylene diisocyanate
[2] trimethylolpropane
[3] isophorone diisocyanate

TABLE 2

| Protecting group | Polyisocyanate | exchangeable protecting groups, in % NCO 4 h, 30° C. | 4 h, 40° C. |
|---|---|---|---|
| 2-hydroxymethylpyridine (of Example II.1.) | TDI/TMP | 0 | 0 |
| 2-Heptanone oxime (from EP 189,727) | TDI/TMP | 0.06 | 0.30 |
| 3,5-dimethylpyrazole (from EP 159,117) | IPDI/TMP | 0.12 | 0.71 |

We claim:

1. A curing component (A) based on polyisocyanates, for binders (B) which contain groups containing active hydrogen, wherein the curing component (A) is a product of the reaction of (a1) polyisocyanates with (a2) α-hydroxyalkylpryidines.

2. A curing component as claimed in claim 1, wherein the α-hydroxyalkylpyridines (a2) have the formula (I)

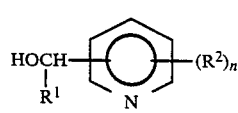

(I)

in which
R[1] denotes H, branched or unbranched alkyl having 1 to 12 carbon atoms, alkenyl having 2 to 12 carbon atoms, cycloalkyl having 6 to 12 carbon atoms or aryl,
R[2] denotes H, branched or unbranched alkyl having 1 to 12 carbon atoms, $(C_1-C_6)$alkoxy, di$(C_1-C_6)$alkylamino or halogen, where, in the case where n>1, the radicals R[2] may be identical or different, and
n denotes 1 to 3.

3. A curing component as claimed in claim 2, wherein the radicals R[1] and R[2] and the index n have the following meanings:
R[1]=H or unbranched $(C_1$ to $C_6)$alkyl or phenyl,
R[2]=H or unbranched $(C_1$ to $C_6)$alkyl or $(C_1-C_6)$alkoxy, and
n=1.

4. Curing component as claimed in claim 1, wherein the α-hydroxyalkylpyridine employed is 2-hydroxymethylpyridine, 3-hydroxymethylpyridine, 4-hydroxymethylpyridine, 2-, 3- or 4-(α-hydroxyethyl)pyridine, 2-, 3- or 4-(α-hydroxypropyl)pyridine, 2-(hydroxymethyl)-4-methylpyridine, 2-(hydroxymethyl)-5-ethylpyri-dine, 2-(hydroxymethyl)-6-methylpyridine, 4-(hydroxybenzyl)pyridine, 2-(hydroxymethyl)-6-chloropyridine or 3-(hydroxymethyl)-6-bromopyridine, or appropriate mixtures.

5. A curing component as claimed in claim 1, wherein the ratio between the number of equivalents of isocyanate groups of the polyisocyanates (a1) and the OH groups of the α-hydroxyalkylpyridines (a2) is 2.2 to 0.9:1.

6. A curing component as claimed in claim 1, wherein the polyisocyanates (a1) employed are diisocyanates or triisocyanates.

7. A curing component as claimed in claim 1, wherein it is (directly) bound chemically to the binder (B).

8. A curable mixture based on
a curing component (A),
a binder (B), which contains groups containing active hydrogen,
if appropriate a diluent (C) and if appropriate additives (D), wherein the curing component present is component (A) as claimed in claim 1.

9. A curable mixture as claimed in claim 8, wherein the curing component (A) has already been reached with at least some of the binder (B).

10. A curable mixture as claimed in claim 8 wherein the binder (B) has a mean molecular weight ($M_n$) from about 1,000 to about 20,000 and contains hydroxyl groups and/or amino groups.

11. Curable surface-coating composition containing a curing component of claim 1.

12. The coating composition of claim 11 which is an electrocoating composition.

* * * * *